July 5, 1960 H. Z. GORA 2,943,354
APPARATUS AND METHOD FOR MOLDING PLASTIC MATERIAL
Filed April 13, 1954 4 Sheets-Sheet 3
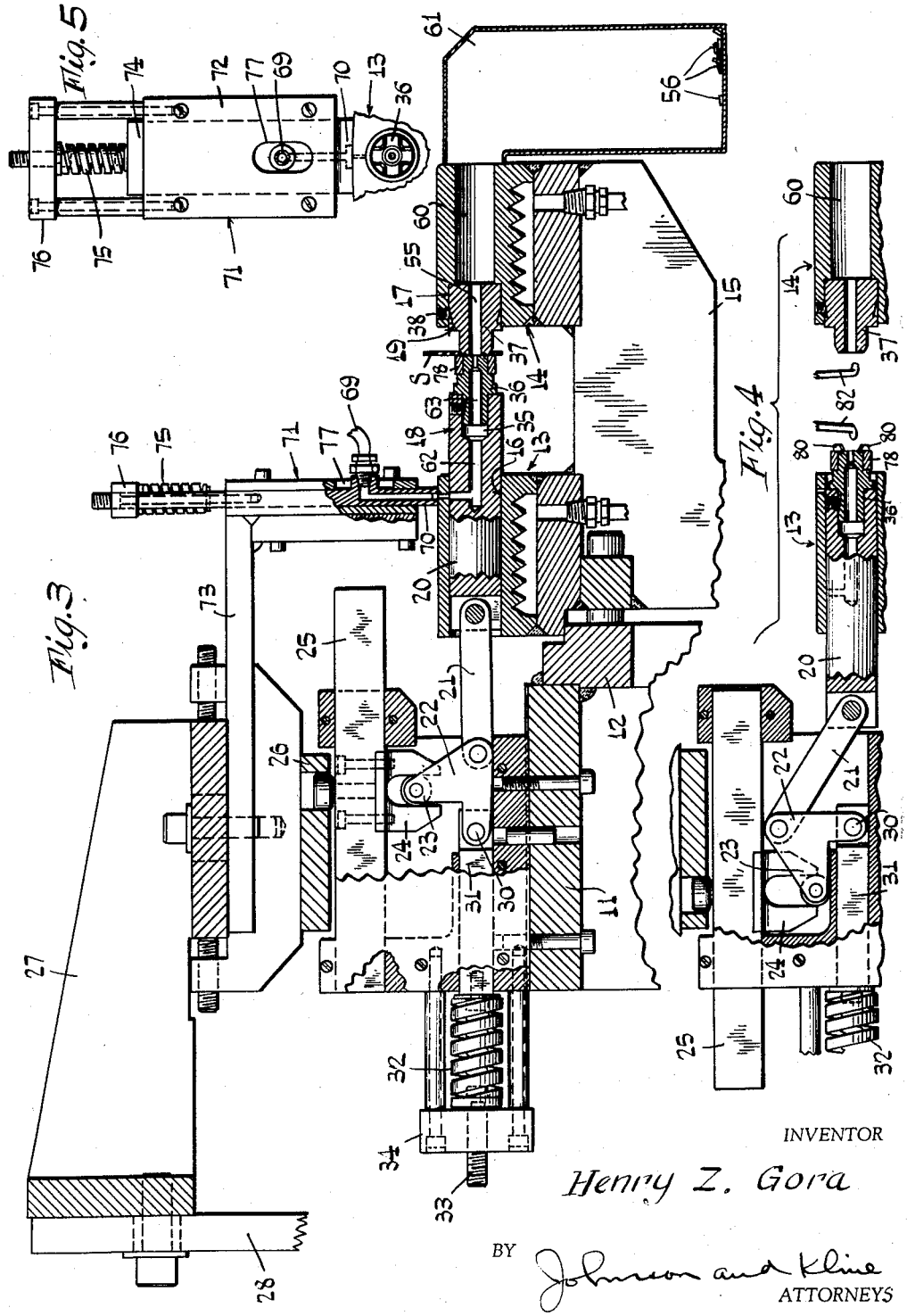
INVENTOR
Henry Z. Gora
BY Johnson and Kline
ATTORNEYS

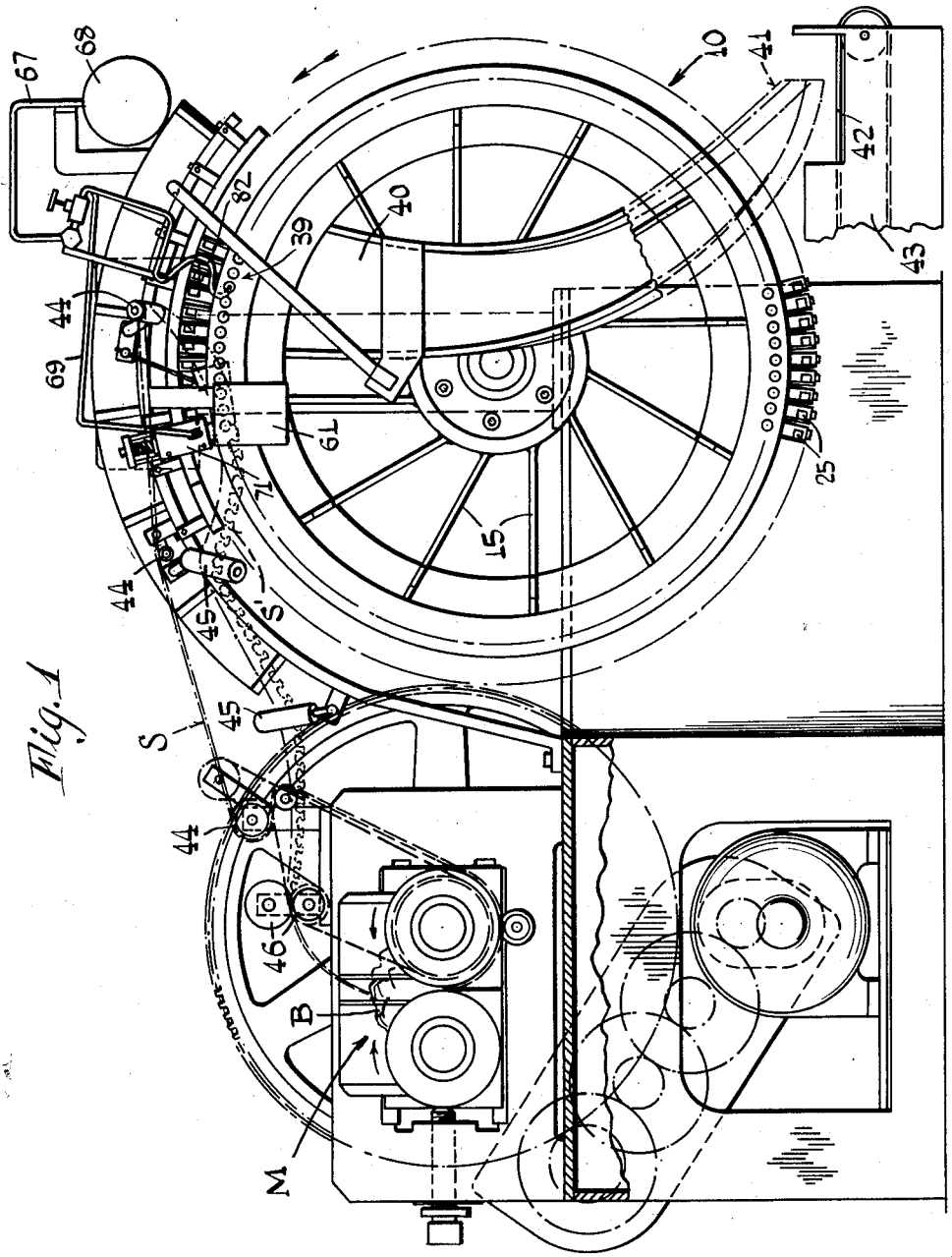
July 5, 1960        H. Z. GORA        2,943,354
APPARATUS AND METHOD FOR MOLDING PLASTIC MATERIAL
Filed April 13, 1954        4 Sheets-Sheet 1
INVENTOR
*Henry Z. Gora*
BY *Johnson and Kline*
ATTORNEYS

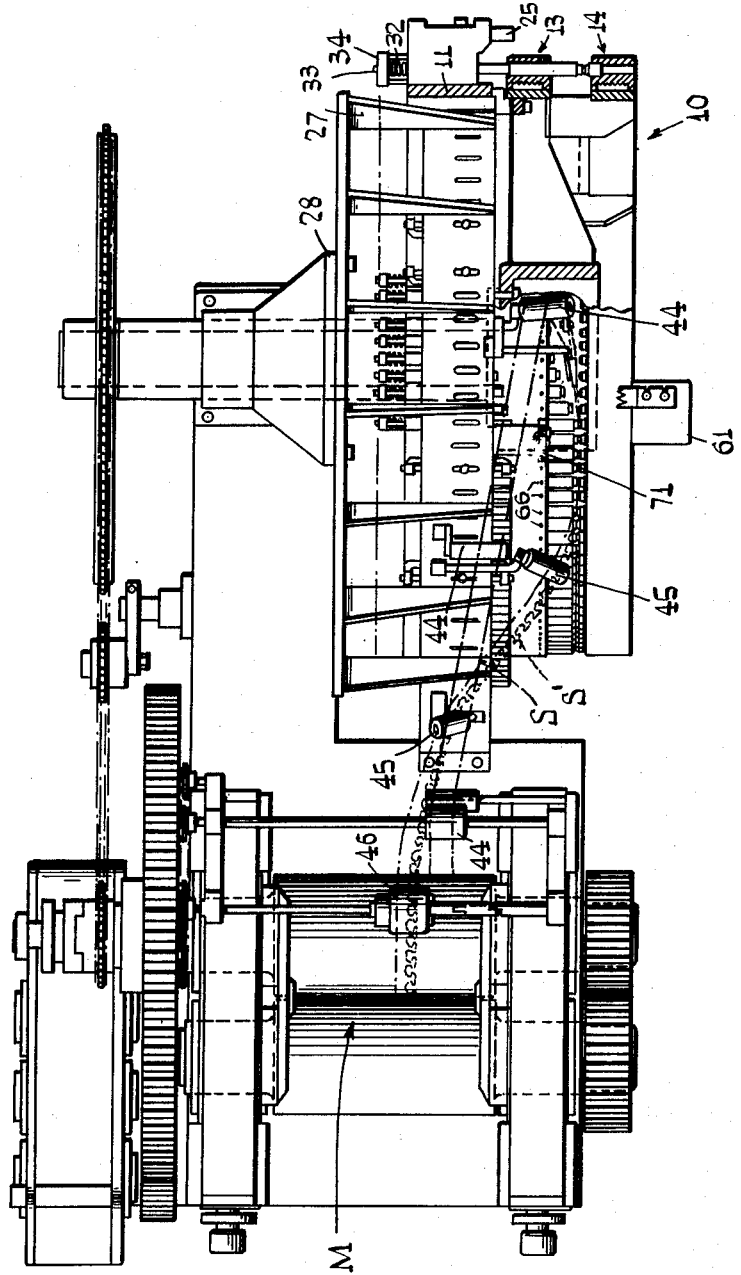

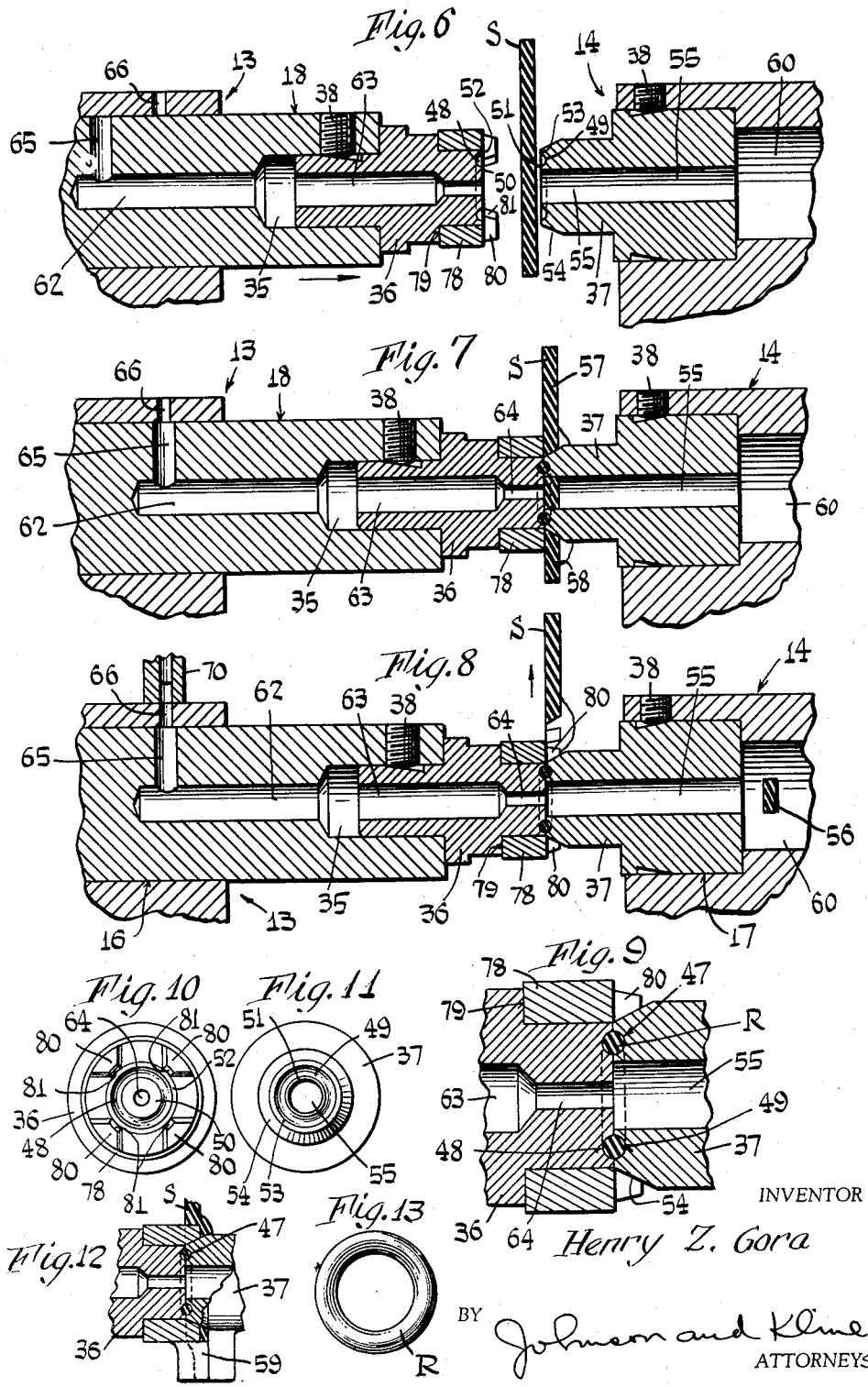

United States Patent Office 2,943,354
Patented July 5, 1960

2,943,354

APPARATUS AND METHOD FOR MOLDING PLASTIC MATERIAL

Henry Z. Gora, Stratford, Conn., assignor, by mesne assignments, to The Eagle-Picher Company, Cincinnati, Ohio, a corporation of Ohio Filed Apr. 13, 1954, Ser. No. 422,930

9 Claims. (Cl. 18—21)

This invention relates to molding of articles of plastic or rubbery material, and more particularly to the methods and apparatus for doing so on a continuous mass production basis.

In the molding of many kinds of articles of plastic material, such as rubber both natural and artificial, particularly those known as technical goods such, for instance, as O-rings and other gaskets, it is important that the two halves of the cavity-forming dies be made accurately and be brought into virtually absolute registration with each other on the molding material. It is also desirable that the flash or overflow from the dies be kept at a minimum in thickness and be capable of removal by ordinary methods such as tumbling. It is also important to reduce the amount of waste material in the molding of such parts to the end that the cost thereof is reduced.

In the case of multi-cavity dies, several methods have been employed. One is to place a sheet of moldable material between the dies, bring the dies together, and cure the pieces, in which case a large amount of the material being cured in the curing of the pieces is wasted and the pieces must be subsequently blanked from the sheet, leaving a flat on the piece along the line of cut. In another method, extruded moldable material of a volumetrically controlled piece of molded material is placed in each cavity, thus effecting a saving in material, but this has the disadvantage that knitting of the several parts of the slug does not always satisfactorily cure with the result that the piece is defective. Another method is the injection or transfer method, but with this method the nibs left by the gates through which the material flows must be removed with the same objectionable loss of intended contour or size of the finished piece.

With the platen type multi-cavity molding method, accurate alignment between the companion parts of each cavity cannot be satisfactorily maintained because of inherent warpage and other changes of form due to expansion and contraction, and even when one part of each cavity-forming member is floatingly mounted and brought together by ordinary aligning means, satisfactory registration and matching of the two halves of the die cannot be maintained with any degree of certainty because of the necessary freedom of movement which the aligning devices as heretofore proposed necessarily required and which increased with wear and use at an appreciable rate, which becomes substantial when materials such as rubber and synthetic rubber are being molded. As a result, with the known methods of molding precision pieces, close inspection must be made of the finished pieces and many, sometimes as much as 50%, must be discarded as unusable at great loss both in time and money.

An object of the present invention is to provide methods and means for overcoming these difficulties and disadvantages of the known methods of molding precision parts, particularly those which must be made by matching cavities such as O-rings to the end that more precise product may be produced with a saving in both man hour, machine hour, as well as inspection costs.

To this end, the present invention provides methods and apparatus for producing precision articles by a continuous flow process with each pair of cavity-forming die members being individually operated like single cavity molds operated in a laboratory press but with the addition that novel and improved means for bringing the cooperating die members into virtually perfect alignment and controlling the proximity of the cooperating die members in such a way that the flash or overflow forms a thin frangible web which may have a thickness in the order of .001" if desired.

To provide for the continuous flow-molding of articles according to the present invention, a plurality of individual pairs of die elements is mounted to travel in a closed path, for instance, by being mounted on a wheel in a circular series and the individual pairs of die elements are opened and closed according to a predetermined plan as the wheel rotates. When the die members are open, i.e. apart, a strip of plastic moldable material is placed between them so that when they are closed on the moldable material the cavity between the dies will be filled and any surplus material will be squeezed out between the cavity-defining surfaces of the die members, each pair of die members being brought together with resilient force individually regulated to that particular pair of die members. After the die members are closed to form the piece, the strip of moldable material is removed from between the dies, and since it is not cured it may be combined with other strip-forming material.

When the dies are brought together, they are brought into alignment so that the cavities thereof register by cooperating abutting surfaces on companion die members and these abutting members are angularly disposed so that little or no sliding movement one on the other occurs when they are brought together, thus reducing the opportunity for wear between them due to frictional rubbing contact.

In the broader aspects of the invention, the strip of moldable material may be provided in any convenient manner, but preferably it is provided in the manner disclosed in my Patent No. 2,593,438 in which a quantity of material is plasticized on mill rollers to form an enveloping layer on one from which is cut a continuous ribbon or strip of prepared moldable material to be guided between the open die members. As in my prior patent, the remainder of the strip after the pieces are molded therefrom is preferably returned to the mill rollers to commingle with the material thereon and replenish material added thereto. In my prior patent, after the pieces were taken from the strip to be molded, the die members were separated temporarily to permit the strip to be released and returned to the mill roller. However, in molding precision parts, particularly parts where the two halves of the cavity are substantially the same, opening the dies to remove the strip has a tendency to disturb the material remaining in the cavities. To avoid this difficulty, I have found that the strip of moldable material may be ripped or torn from its impalement on the companion dies without breaking the continuity of the strip, and this method of removing the strip is preferable under the conditions referred to.

After the material is confined in the cavity, the cavity remains closed for a determinate length of time as the wheel rotates until the cavity reaches a discharge station in order to set or semicure the material, after which the piece is ejected from the cavity. The linear speed of the circular arrangement of cooperating die elements depends upon the composition of the moldable material, for instance the kind of accelerator used, the hardness of the material, and the degree of setting or semicuring required to stabilize the shape and size of the piece during the time that a pair of dies remains closed on the molded piece. After the piece is ejected from the dies, it may be further cured by passing it through a curing oven to complete the curing operation.

In molding pieces having a substantial internal hole through it, such as an O-ring, to avoid curing and thus loss of the usefulness of the slug blanked from the strip in forming the ring, the present invention provides die members each having a bore, the bore of one die member being large enough to provide a discharge opening permitting the slug to pass through it to the exterior of the wheel where it may be collected, and the bore of the other die member permitting a blast of air to strike the slug and force it through the discharge opening of the other die member.

With the die member operating means and aligning means of the present invention, it is possible to bring the dies so close together that very little if any flash remains on the molded piece. However, since the material may have unavoidably contained within it, as from the filler used, very minute, hard pieces which would chip the thin meeting edges of the dies, it is preferable in most cases that the dies be so brought together as to permit a flash in the order of .001" which is easily tumbled off under properly controlled conditions without leaving any appreciable or discernible alteration in the desired contour of the piece.

This application is a continuation in part of my co-pending application Serial No. 282,795, filed April 17, 1952, now Patent No. 2,864,123, granted December 16, 1958.

Other features and advantages will hereinafter appear.

In the accompanying drawings:

Figure 1 is a side elevation of the apparatus of the present invention.

Fig. 2 is a plan view of the apparatus shown in Fig. 1.

Fig. 3 is a vertical fragmentary section of the apparatus shown in Fig. 1 showing parts of the molding wheel, the die holders and means for operating the same, the dies being shown in closed position.

Fig. 4 shows a fragment of the view shown in Fig. 3 showing the dies and the die operating mechanism in "die-open" position.

Fig. 5 is an elevation of the device for applying force to remove the center slug when molding an apertured piece and showing a portion of the molding wheel and a die carried thereby.

Fig. 6 is a vertical section taken through the pair of cooperating dies and their holders showing the ribbon of moldable material interposed between the dies.

Fig. 7 is a view similar to Fig. 6 showing the dies closed on the ribbon and trapping a quantity of molding material in the cavity formed by the dies to mold the article and remove the center slug from the ribbon.

Fig. 8 is a view similar to Figs. 6 and 7 but showing the cooperating dies advanced to the point where the ribbon is being stripped from the dies and the slug is being ejected.

Fig. 9 is an enlarged view of the adjacent portions of the cooperating dies showing the dies in article molding position.

Fig. 10 is a face view of one of the pair of dies showing the aligning lugs.

Fig. 11 is a face view of the other of the pair of dies.

Fig. 12 is a view similar to Fig. 11 but showing a modification in which a cutting or scoring blade is carried by one of the cooperating dies.

Fig. 13 is a plan view of an O-ring as molded in the dies shown in Fig. 9.

For purposes of illustration, I have shown my present invention applied to the kind of molding described and claimed in my copending application Serial No. 282,795, filed April 17, 1952, in which moldable material is plasticized on a warming mill M, formed into a ribbon-like strip S and passed between successive pairs of die members mounted on a rotary carrier 10. It comprises ring portions 11, 12, 13 and 14 attached together and to spokes 15.

The rings 13 and 14 are chambered for heat control and have socket holders 16 and 17 formed by axially aligned, arcuately spaced bores in which are supported respectively movable die members 18 and relatively stationary die members 19. The die member 18 includes a plunger 20 slidably mounted in the holder 16 and has on one end a pivotal connection to a link 21 connected to a bell crank 22, one arm 23 of which has a roller engaging a fork 24 on a slide bar 25 carrying a roller to engage and be operated by a cam 26 carried by an extension 27 of the frame 28 of the machine.

When the bar 25 is in the position shown in Fig. 4, the plunger is retracted and opens a space between the fixed and movable dies for the introduction of the ribbon S of plastic moldable material. As the rotation of the carrier 10 proceeds, the bar 25 is slid to the right, as shown, by the cam 26 causing the bell crank to be rocked clockwise and the link and plunger to move to the right to the position shown in Fig. 3, closing the dies on the ribbon, impaling the ribbon and forming a blank of the article to be molded. It will be observed that the bell crank 22 and link 21 form a toggle joint that may move to or slightly beyond dead-center and thus lock itself in extended position.

To control the force to be applied by the movable die member 18 against the moldable material and the stationary die member 19 the pivot pin 30 of the bell crank 22 is mounted in a slide 31, the end of which is engaged by a spring 32 backed by an adjusting screw 33 in an overhand 34. When the die members are brought together, should excessive resistance be offered by the molding material, the spring 32 will yield temporarily but will apply predetermined force and "close" the dies as the resistance is overcome. The parts are so proportioned that when the dies are in "closed" position the spring 32 is in a slightly compressed condition, thereby maintaining the dies yieldingly closed under determinate pressure. As the material trapped within the die cavity expands upon being heated by contact with the dies, the spring 32 may be further compressed, thus allowing the excess material to flow out of the cavity. When expansion of the molding material ceases, the dies are again yieldingly urged together by the action of the spring 32.

The cam 26 may be shaped to close the dies to remove a blank from the ribbon, to open the dies to remove the ribbon and other unwanted material from the space between the dies, to close again on the blank to form the material being heated by the dies and open the dies again to permit discharge of molded and semicured pieces. However, as will be more fully explained below, the cam 26 may be arranged to omit the operation of opening the dies to permit the removal of the ribbon.

To provide for interchangeability of the dies so that parts of different shapes and sizes may be molded, the dies proper are removably mounted. As shown the movable die member 18 has a socket 35 carrying the die 36, while the die member 19 which carries the companion die 37 is removably mounted in the socket 17, the die 36 and the die member 19 being secured in position by set screws 38.

After being closed upon the molding material the dies are moved by the carrier to a discharge station 39 at which time the dies are opened and the articles contained within them are discharged, falling upon a chute 40, and travel on the chute 40 to the lower end 41 thereof, where they fall upon a conveyor belt 42 contained within an article treating tunnel 43. The speed of rotation of the carrier 10 is so regulated that the shape and the size of the molded article is stabilized by the time it reaches the discharge station 39, any additional thermal treatment which the molded article may require being completed in the tunnel 43.

The ribbon S of moldable material which is taken from the mill M is guided over suitable rollers 44 from the mill to the molding wheel so that it passes between the traveling open die members with its faces in a substantially vertical plane. The width of the ribbon is somewhat greater than the diameter of the piece to be taken from it by the dies so that when it is thus skeletonized by the dies a substantial portion remains continuous, to be carried back to the mill to commingle with the blank B thereon. The skeletonized portion S' of the ribbon is carried back to the mill by guide rollers 45 and power-driven rollers 46.

The dies 36 and 37 form between them a cavity 47 having the shape and size of the article to be molded. As shown in Figs. 6, 7 and 8 the cavity is doughnut-shaped so as to form an O-ring which is circular both in cross-section and in outline, the recesses 48 and 49 in the dies 36 and 37 respectively forming the cavity, being identical with the parting line coincident with the diameter of the ring. The cavity 47 thus formed is delineated by inner cut-off surfaces 50 and 51 and outer cut-off surfaces 52 and 53 on the dies 36 and 37 respectively. The end of the die 37 has a tapered surface 54 which reduces the cut-off surface to a flat in the order of .065" and provides an outwardly flaring space between it and the companion die into which the remaining portion of the ribbon S and the excess molding material trapped by the closing dies may freely flow. Likewise the inner cut-off surface 51 is reduced to a flat of about .065" by a bore 55 in the die 37 into which the unneeded piece or slug 56 of molding material flows or is forced by the closing dies.

It will be understood of course that the ribbon S entering between the dies was sufficiently softened in the warming mill to be readily flowable yet hard enough to maintain its form as a ribbon in passing from the mill M to the molding wheel and then back to the mill.

In molding certain articles which because of their shape or the position of the parting line with relation to the cavity, after the dies are closed on the ribbon to remove the needed molding material, the dies may be separated, leaving the article in one or the other of the recesses of the dies and the ribbon S may then be conveniently guided out from between the dies. However, in molding certain articles, such as O-rings R, when the recesses in the dies forming the cavity are shallow or substantially the same there is no assurance that the molding material will remain undisturbed in one or the other of the dies when the dies are separated and thereby avoid malformation when the dies are again closed.

This was a double problem in the molding of O-rings or other apertured articles, for not only must the ribbon be released from the closed dies but the unneeded material from which the aperture was formed must be removed from the dies, i.e. from the bore 55 of the die 37 as shown, otherwise the ribbon and the slug would be cured along with the article being molded and thus not recoverable by reworking in the mill.

To solve the problem of removing the ribbon, the present invention provides for tearing the ribbon off the closed dies on which it is impaled. For this purpose the ribbon is made sufficiently wider than the diameter of the article to be molded to leave a substantial carrier edge 57 at one side of the ribbon and the ribbon is guided into position between the open dies so that the hole left in the ribbon by the material removed therefrom by the dies is close to the other edge 58 of the ribbon. Thus when the ribbon is pulled by the feed rollers 46 in a direction controlled by the guide rollers 45 upwardly and away from the advancing dies which are closed upon it, the material between the hole and the edge 58 is stressed and breaks to permit the dies to push through the rupture thus formed, the ribbon remaining intact along the edge 57 so that it can be carried back to the mill M.

To facilitate this rupturing of the ribbon when the ribbon is thick, the dies may be provided with a cutter 59 as shown in Figs. 12 to score or cut through the ribbon between the hole in the ribbon and the edge 58. The fact that the ribbon and dies take divergent paths as shown in Fig. 1 causes the rupture to open and spread sufficiently to permit the dies to easily escape from the ribbon.

To remove the unneeded center portion or slug 56 of the material in the bore 55 of the die 37, the bore is extended to the back end of the die and force is applied to the slug 56 to extend it through the bore 55 and an aligned bore 60 in the ring 14, after which the slug is caught and retained in a basket 61.

The force which expels the slug 56 from the die, according to the present invention, is supplied through the die holder 18 which, for this purpose, is provided with an axial bore 62 which aligns with a bore 63 in the die 36 opening through a port 64 in the face of the die. As shown in the accompanying drawings, the force applied to the slug 56 is compressed air which reaches the bore 62 through a radial passage 65 which aligns with a passage 66 in the ring 13. Compressed air which is fed to the apparatus through a pipe 67 passes through a heater 68, and from the latter through a pipe 69 to a nozzle 70 of an outlet device 71 shown in Fig. 5. The outlet device 71 includes a housing 72 mounted on a bracket 73 secured to the machine frame arm 27 and contains within it a plunger 74 having at its lower end the outlet 70. A spring 75 is located between the plunger 74 and a bracket 76 on the housing and tends to move the plunger outwardly of the housing. The supply pipe 69 is flexible and has its end secured directly to the plunger 74 extending through a slot 77 in the housing 72. The outlet end of the plunger 74 is in the form of a shoe curved to fit the periphery of the ring 13 against which it is resiliently urged by the spring 75 with sufficient force to prevent escape of any substantial amount of air between it and the periphery of the ring, and the outlet 70 is so positioned that it becomes aligned with the orifices 66 in the ring only during the times that force should be applied to the slugs 56.

Since the outlet 70 is closed off by the surface of the ring during rotation of the carrier 10 until an orifice 66 registers with the outlet 70, as soon as that happens a sudden blast of air is sent through the passage 65, bores 62, 63 and port 64 against the slug 56 causing it to be ejected as shown in Fig. 8. This operation occurs as soon as practical after the dies have been closed and about the same time that the ribbon S begins to be pulled from the closed dies. When the blast of air hits the slug 56, the latter acts as a piston within the cylindrical bore 55 of the die 37 and thus causes the full force of the air to produce its movement. In some cases, especially where the slug is large, it is desirable to taper the bore 55 slightly from the die-face end toward the rear to reduce the friction between the slug and the walls of the bore 55.

The slugs 56 collected in the basket 61 may be returned to the mill M when a sufficient quantity has been collected to mingle with the material on the mill. Thus, the present invention avoids any loss of the material taken from the center of the O-ring and yet the material from which the O-ring is molded is one solid piece of well knitted-together material as distinguished from O-rings in which the ends of a rod of material must knit within the die cavity.

It is desirable that the flats on the cut-off surfaces 51 and 53 be quite narrow so that the quantity of flash material is reduced to a minimum, yet the narrower the cut-off surfaces the less they can be depended upon as limiting the closing movement of the dies without damage to themselves or the opposite cut-off surfaces, and the problem has been to supply other means for limiting the closing movements of the dies.

Another problem, particularly in connection with symmetrical parts having the parting line on the axis of symmetry such as is the case with O-rings, was to bring the cooperating dies into axial alignment. Ordinary registering means, such as aligning pins and holes, it has been found are unsatsifactory because they are short-lived due to the excessive wear caused by the abrasive action of the molding material on the aligning pins.

These problems have been solved by the present invention by the provision of simple and efficient means which both limits the closing movement of the cooperating dies without depending upon contact between the opposed cut-off surfaces and also brings them into axial alignment with a minimum of relative rubbing movement between the aligning elements.

For this purpose, the present invention provides on the the die 36 a stopping and aligning ring 78 which surrounds the reduced end of the die and engages a shoulder 79 thereon. The ring 78 is provided with a plurality of equispaced lugs 80 having cam surfaces 81 which are ground to fit the tapered surface 54 of the die 37, four lugs 80 being provided in the form of the die shown in Figs. 6, 7 and 8. When the dies are closed on the ribbon S, the lugs 80 pierce the ribbon without appreciable resistance therefrom since the material is softened for molding, and this continues until all or practically all of the material is squeezed out between the cam surfaces 81 and the tapered surface 54 before these parts come together. When the cam surfaces 81 and the tapered surface 54 come together, if the dies 36 and 37 are not in axial alignment they are brought into that relation by the nesting of the lugs and tapered surface 54, the movement being permitted by the ordinary tolerance between the dies and their holders which is necessary to permit the removal and replacement of dies when interchanging them.

The cam surfaces 81 are so formed with relation to the tapered surface 54 that, when all the cam surfaces 81 engage the tapered surface, movement of the dies toward each other is virtually stopped with the cut-off surfaces 50 and 52 predeterminately positioned with relation to the cut-off surfaces 51 and 53. Further microscopic movement of the cooperating die members toward each other depends upon the resiliency of the lugs 80 and the force with which the die members are being pressed together. Since the force with which the die members are moved together is controlled by the tension of the spring 32, adjustment of the screw 33 may regulate this force. Thus, the ultimate position of the cut-off surfaces 51 and 53 with relation to the cut-off surfaces 50 and 52 may be further precisely controlled for each individual pair of cooperating dies by adjusting their screws 33.

It will be understood, of course, that due to the steep angle of the cam surfaces 81 and the tapered surface 54, very little, if any, relative sliding movement occurs between these surfaces when they perform their aligning and stopping functions. Any molding material remaining between the cam surfaces 81 and the tapered surface 54 as these parts come together merely flows out from between them without any substantial abrasive effect, since there is no pressure between these parts until the movement has virtually ceased.

The provision of means for precisely adjusting the closing movement of the die is extremely important, for it permits the thickness of the flash remaining between the cooperating cut-off surfaces to be controlled from virtually nothing to a permissible thickness. For instance, when the molding material employed contains discrete particles less than .001", in the filler for instance, the adjustment of the screw 33 may be made so as to leave a space of .001" between the cooperating cut-off surfaces, thereby avoiding chipping of the cut-off surfaces by hard particles of less than .001" coming between them. On the other hand, if the material contains no such discrete particles, the screw 33 may be adjusted so that the cooperating cut-off surfaces just barely touch when the dies are closed, thus reducing the thickness of the flash to an infinitesimal amount, if any.

It will be understood, of course, that the ring 78 is hardened and tempered so that the lugs 80 will have the desired degree of resiliency.

The surfaces of the cavities of the dies may be lubricated in the well known manner as, for instance, by sprays 82 shown in Figs. 1 and 4.

From the above it will be seen that, with the method and apparatus of this invention, it is possible to mold, by continuous process, articles such as O-rings which must be made with precision, since they function with other precisely made mechanical parts. Each article molded according to the present invention is molded in its individual mold, thereby avoiding the difficulties attendant upon the use of multi-cavity molds. Also, it should be noted that the articles may be molded with virtually no loss of molding material, the only material not reworkable being the slight flash which remains on the article during curing and which is removed by tumbling in the usual manner.

Variations and modifications may be made within the scope of the claims and portions of the improvements may be used without others.

I claim:

1. In the method of molding articles in continuous succession by closing two die members each having abutting cut-off surfaces on a strip of molding material, the steps of applying constant predetermined resilient force opposing the final closing movement of the die members; effecting the closing movement of the die members with a variable resilient force which is capable of substantially overcoming said constant predetermined force which opposes the final closing movement of the die member whereby the abutting cut-off surfaces of the die members may be brought into substantial engagement through the strip of molding material; and adjusting said variable resilient force so as to partially overcome said constant predetermined resisting force so that the cut-off surfaces of the dies are prevented from being brought into engagement at the completion of the die-closing movement whereby the cut-off surfaces are spaced from each other a determinate distance.

2. In apparatus for molding articles in continuous succession, having a base, a carrier having a series of article-forming units traveling in an endless path with each unit having a pair of coaxial cooperative dies together forming a molding cavity, means for causing said dies to open in succession at a discharge station and to be open at a loading station, means for guiding a continuous strip of molding material between said dies while the latter are respectively at said loading station, and means to close each pair of dies and blank out from said strip a quantity of molding material sufficient to fill the molding cavity: the improvement comprising cooperating cut-off surfaces on said dies respectively outlining the molding cavity, said means for closing the dies including resilient means for moving the dies of each pair into juxtaposed molding position, yielding means carried by the dies having a constant predetermined resilient force acting against the closing of the dies, and means for varying the force of said resilient means of said die closing means.

3. In apparatus for continuously molding and semicuring articles of vulcanizable material, a continuous succession of pairs of cooperating die members at least one of which reciprocates relative to the other; means for traveling said die members past a given point; means for heating said die member; means for guiding a continuous strip of plasticized molding material having slightly greater width than the width of the die members between the latter when open; means for closing the die members of each pair one after the other on successive portions of said strip to bring cavity defining cut-off surfaces thereon into juxtaposed cavity-closing position to remove a portion of the material from said strip and confine it in the cavity to form an article leaving the remainder of the strip continuous and impaled by the closed die members; power driven feed rolls for pulling the remainder of the strip away from its impalement on successive pairs of closed die members while the dies are traveling and while an adjacent pair of die members is in closed position and another closely adjacent pair of die members is being moved to closed position; means for returning the remainder of the strip to the place from whence it came; and means holding the die members closed for a predetermined time to semicure the material contained in the cavity.

4. In the method of continuously molding articles of plastic material which includes the steps of guiding between a continuous succession of pairs of traveling, heated open cavity-forming cooperating die members a continuous strip of molding material having somewhat greater width than the width of the die members; closing the die members of each pair one after the other on successive portions of said strip to bring cavity defining cut-off surfaces thereon into juxtaposed cavity-closing position to remove a portion of the material from said strip and confine it in the cavity to form an article, leaving the remainder of the strip continuous and impaled by the closed die members, the improvement which comprises the additional steps of: removing the remainder of the strip from its impalement on a pair of closed die members while the die members remain closed and continue to travel and while a next adjacent pair of die members is in closed position and another closely adjacent pair of die members is being moved to closed position on the strip; moving the strip away from the heated die members and returning the remainder of the strip to the place from whence it came; continuing to hold the die members closed for a predetermined time to cure the material contained in the cavity; and finally after a predetermined time opening the die members one after the other to discharge the molded articles from the cavities.

5. The improvement as defined in claim 2 in which the means acting to resist the closing of the dies comprises resilient lugs carried by and projecting beyond the cut-off surfaces of one of the dies of each pair and a cooperating member carried by the other die of the pair positioned to be engaged by said lugs during the final closing movements of the dies.

6. The improvement as defined in claim 5 in which said lugs and said cooperating member have cam surfaces shaped to penetrate said strip of molding material and engage to bring the dies into alignment as the dies approach molding position.

7. The improvement as defined in claim 6 in which the relative position of said cam surfaces and their angularity is such that they engage to bring the dies into alignment only when the dies are almost closed whereby rubbing contact between the cam surfaces and between the latter and the molding material is substantially reduced and wearing of the cam surfaces minimized.

8. In apparatus for molding articles in continuous succession, having a base, a carrier having a series of article-forming units traveling in an endless path with each unit having a pair of coaxial cooperative dies together forming a molding cavity, means for causing said dies to open in succession at a discharge station and to be open at a loading station, means for guiding a continuous strip of molding material between said dies while the latter are respectively at said loading station, and means to close each pair of dies and blank out from said strip a quantity of molding material sufficient to fill the molding cavity: the improvement comprising one of said dies of each pair having a plurality of equispaced lugs extending outwardly and laterally beyond the face of the die and the other of the dies of each pair having a conical tapered nose located laterally beyond and receding from the face of the die and cooperating with the lugs on the other die, said lugs and conical tapered nose being shaped to penetrate said strip of molding material and operatively engage therethrough when the dies are moved to juxtaposed molding position and control the axial alignment of the dies in molding position.

9. The method of continuously molding articles of plastic material as defined in claim 4, in which the remainder of the strip is removed from its impalement on a pair of closed dies by being torn therefrom.

References Cited in the file of this patent

UNITED STATES PATENTS

| | | |
|---|---|---|
| 587,961 | Hardman | Aug. 10, 1897 |
| 891,642 | Tretzmann | June 23, 1908 |
| 1,040,737 | Murray | Oct. 8, 1912 |
| 1,242,776 | Curtis | Oct. 9, 1917 |
| 1,647,379 | Swift | Nov. 1, 1927 |
| 1,711,978 | Wanders | Mar. 7, 1929 |
| 1,797,568 | Dean | Mar. 24, 1931 |
| 1,877,761 | Brown | Sept. 20, 1932 |
| 1,792,174 | Marcus | Feb. 10, 1934 |
| 1,942,398 | Fowler | Jan. 9, 1934 |
| 1,965,732 | Blisterfield | July 10, 1934 |
| 1,972,789 | Newkirk | Sept. 4, 1934 |
| 2,251,135 | Iknayan et al. | July 29, 1941 |
| 2,440,366 | Cropp | Apr. 27, 1948 |
| 2,548,304 | Gora | Apr. 10, 1951 |
| 2,548,306 | Gora | Apr. 10, 1951 |
| 2,646,595 | Leistensnider | July 28, 1953 |
| 2,657,426 | Gora | Nov. 3, 1953 |
| 2,748,425 | Coffey | June 5, 1956 |

UNITED STATES PATENT OFFICE
CERTIFICATE OF CORRECTION

Patent No. 2,943,354

July 5, 1960

Henry Z. Gora

It is hereby certified that error appears in the printed specification of the above numbered patent requiring correction and that the said Letters Patent should read as corrected below.

Column 4, lines 33 and 34, for "overhand" read -- overhang --; column 6, line 3, for "Figs." read -- Fig. --; column 10, line 43, list of references cited for 1,792,174    Marcus ---- Feb. 10, 1934 read 1,792,174    Marcus ---- Feb. 10, 1931

Signed and sealed this 13th day of December 1960.

(SEAL)
Attest:

KARL H. AXLINE
Attesting Officer

ROBERT C. WATSON
Commissioner of Patents